United States Patent [19]

Howells et al.

[11] 4,154,986
[45] May 15, 1979

[54] TIME SLOT INTERCHANGING NETWORK

[75] Inventors: George A. Howells, Bishop's Stortford; Roger M. Hochreutiner, Harlow, both of England

[73] Assignee: International Standard Electric Corporation, New York, N.Y.

[21] Appl. No.: 909,407

[22] Filed: May 25, 1978

[30] Foreign Application Priority Data

May 26, 1977 [GB] United Kingdom .............. 22279/77

[51] Int. Cl.² ........................................... H04Q 11/04
[52] U.S. Cl. ............................................. 179/15 AQ
[58] Field of Search ..................... 179/15 AQ, 15 AT

[56] References Cited

U.S. PATENT DOCUMENTS

| 3,263,030 | 7/1966 | Stiefel | 179/15 AT |
| 3,596,000 | 7/1971 | Lutz | 179/15 AQ |
| 3,740,483 | 6/1973 | Pedersen | 179/15 AQ |

Primary Examiner—David L. Stewart
Attorney, Agent, or Firm—James B. Raden; Marvin M. Chaban

[57] ABSTRACT

A time slot interchanging network for use in digital switching. Two shift registers are used, one coupled to receive information from the incoming highway, the other coupled to feed information to the outgoing highway. The shift registers are identical in bit capacity and coupled in parallel. A circulating memory operative at the clock rate of the registers is synchronized with the incoming register to control transfer gates feeding the outgoing register.

9 Claims, 13 Drawing Figures

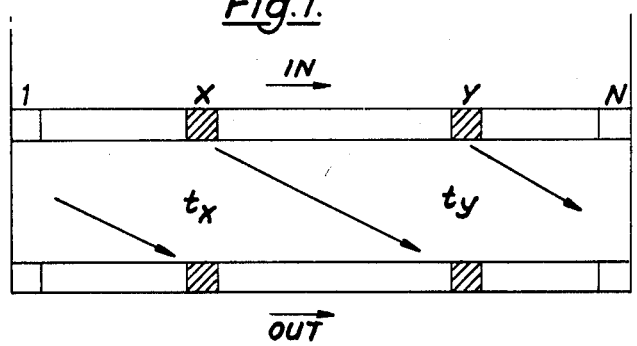
Fig.1.
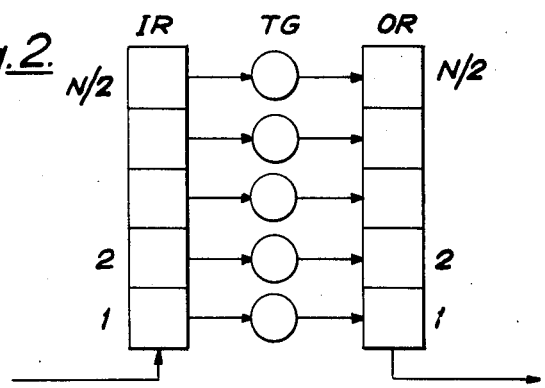
Fig.2.
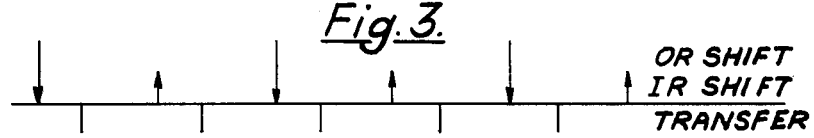
Fig.3.
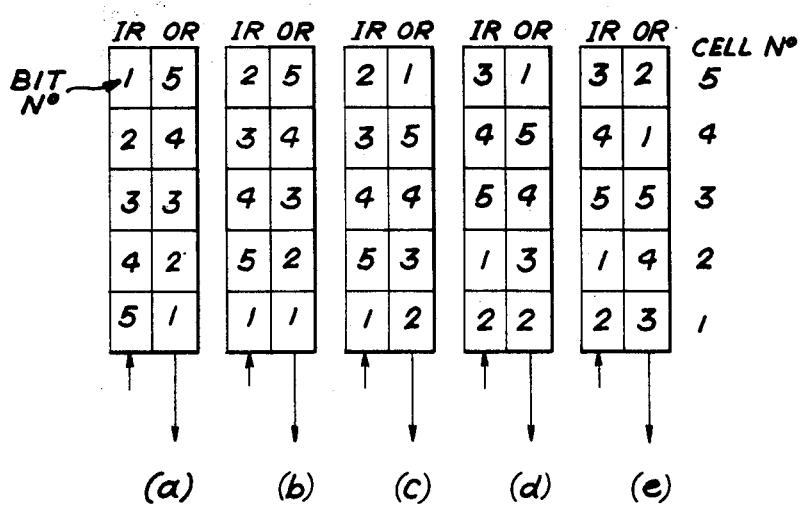

TIME SLOT INTERCHANGING NETWORK

This invention relates to digital time switching structures such as may be used in PCM networks, either for time switching along or in conjunction with space switching structures.

The invention makes use of the basic principle that to interconnect PCM channels X & Y on a multiplexed highway it is necessary to delay a bit arriving in channel X at time $t_x$ until time $t_y$ corresponding to channel Y occurs, and vice versa for bits arriving in channel Y in a duplex system, as known in the prior art.

The basic implementation of this is to use two shift registers which are shifting in opposite directions. The incoming highway feeds into an input shift register IR and the outgoing highway is fed from output shift register OR.

Each shift register has a total capacity of n/2 bits where there are n/bit multiplexed channels on the highways. The cells in the two shift registers are connected by n/2 parallel transfer gates TG. The simplest configuration, as shown, results in multiple delays of at least 2 units (bit periods). Thus, a bit transferred from cell IR (1) to cell OR (1) is delayed by 2 units, from IR (2) to OR (2) by 4 units and so on. To implement delays of single units it is necessary to interleave the shift times of the register. Thus, assuming that after OR has shifted by one bit position, IR (1) and OR (1) are aligned. Then if IR is shifted, IR (1) will now be aligned with OR (2). After the next OR shift, IR (1) will be aligned with OR (3) and after the next IR shift, IR (1) will be aligned with OR (4) and so on.

The present invention is concerned with the control means required to utilize such transfer mechanisms in the construction of a time switch for multiplexed digital networks.

According to the present invention, there is provided a digital time switching arrangement including at least one pair of similar shift registers, incoming and outgoing respectively, each having a capacity of n/2 bits, arranged in a parallel configuration but shifting in opposite directions, transfer means for selectively transferring the contents of the incoming shift register cells 1, 2, 3, ... (n/2)−1, n/2 to the n/2, (n/2)−1, ... 3, 2, 1, cells of the outgoing register respectively under the control of a control means, and means for clocking the shift registers at the same rate, said control means comprising a circulating memory, circulating in synchronism with the incoming register, wherein is stored information relating to the required transfer time of each of said transfer gates, a source of transfer gate identities and means for producing control signal for each transfer gate when there is coincidence of the transfer time for that gate with the gate identity.

In order that the above and other features of the invention may be best understood, embodiments of the invention are now described with reference to FIGS. 1-13 the accompanying drawings in which:

FIG. 1 shows a known time shifting arrangement;

FIG. 2 shows a network for the arrangement of FIG. 1;

Figure 4:
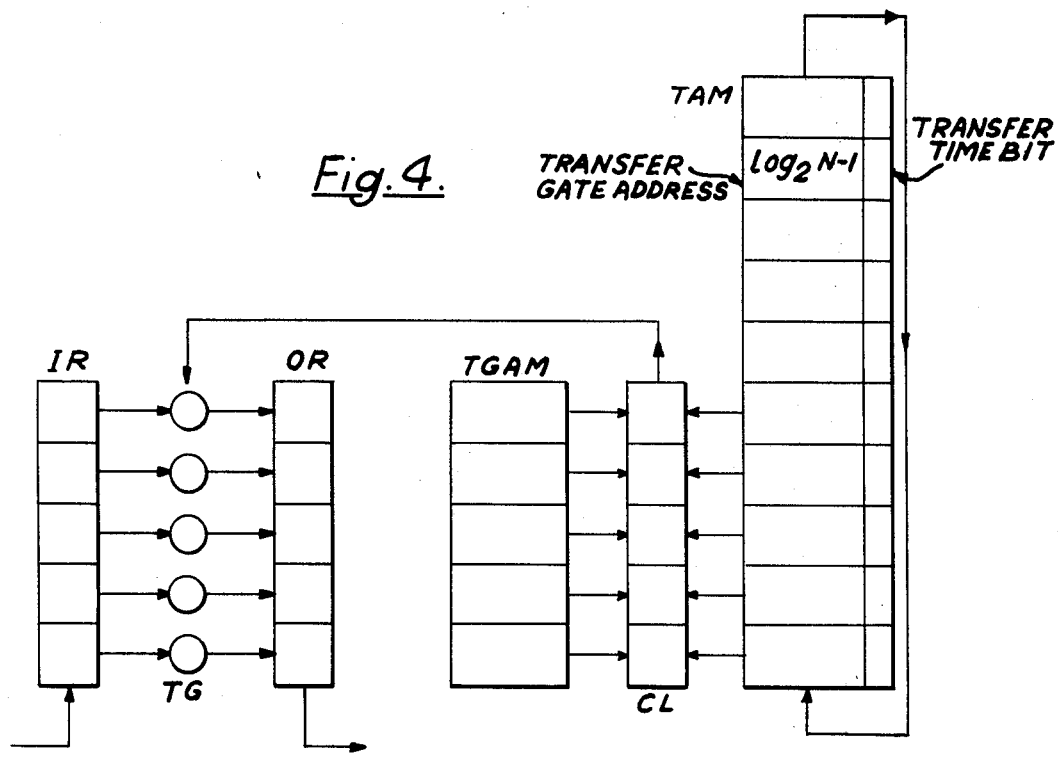
Figure 5:
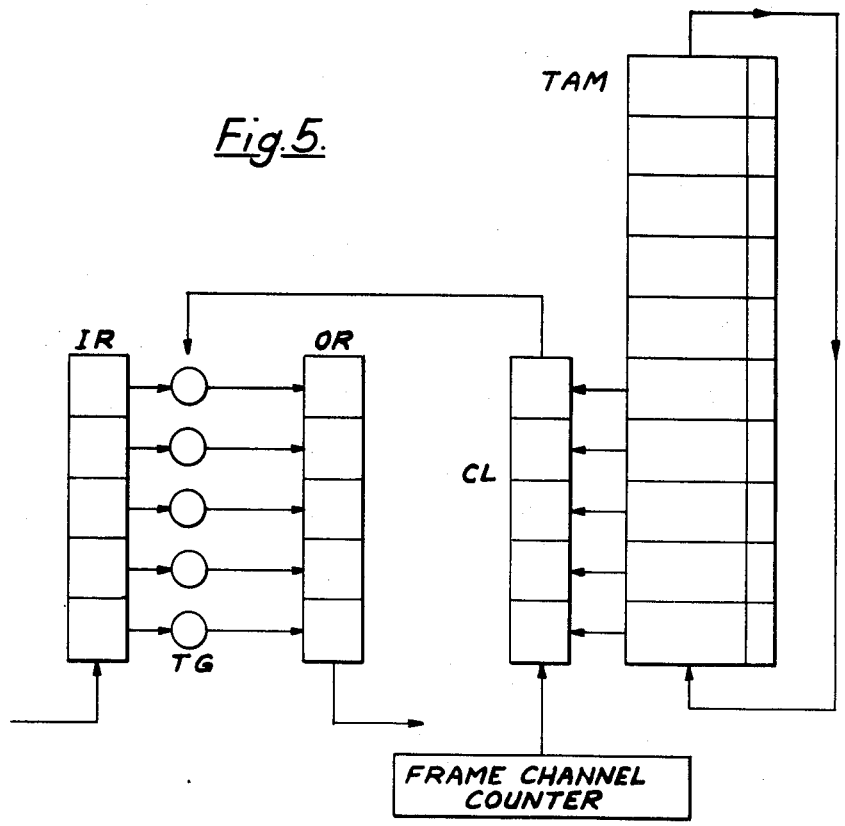
Figure 6:
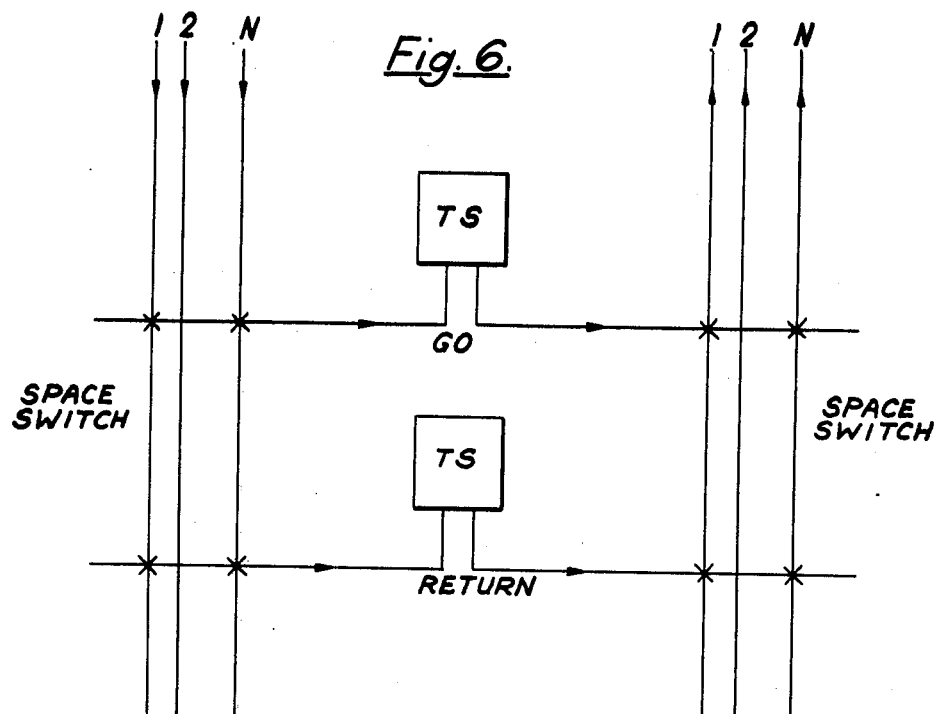
Figure 7:
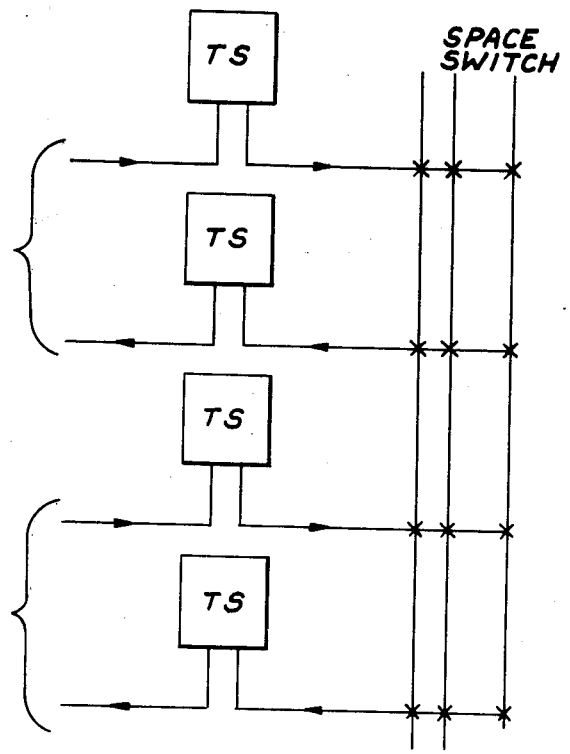
Figure 8:
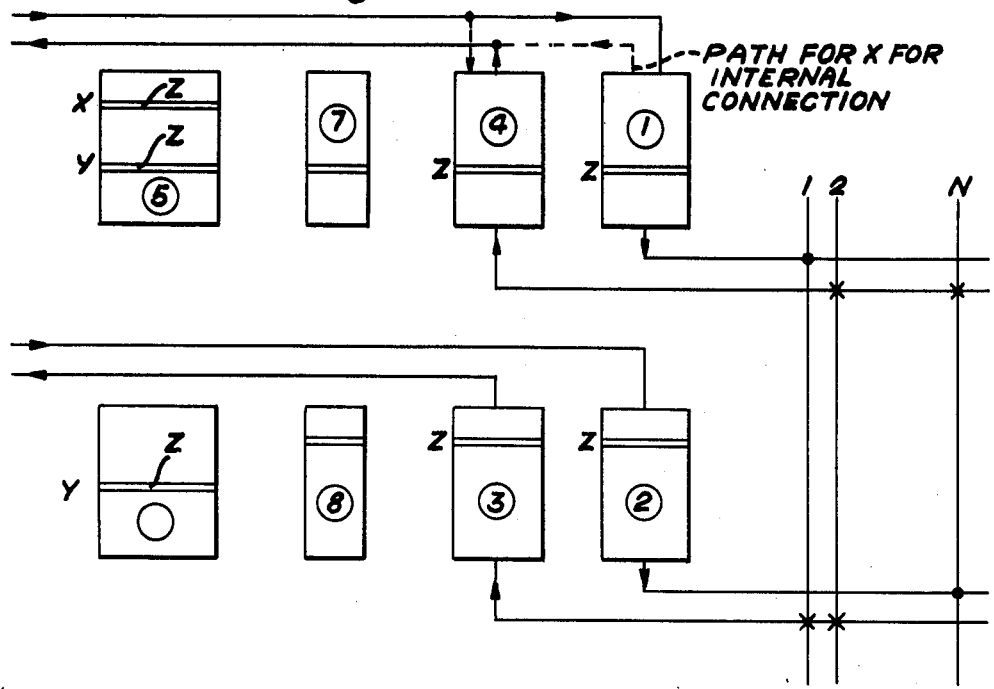
Figure 9:
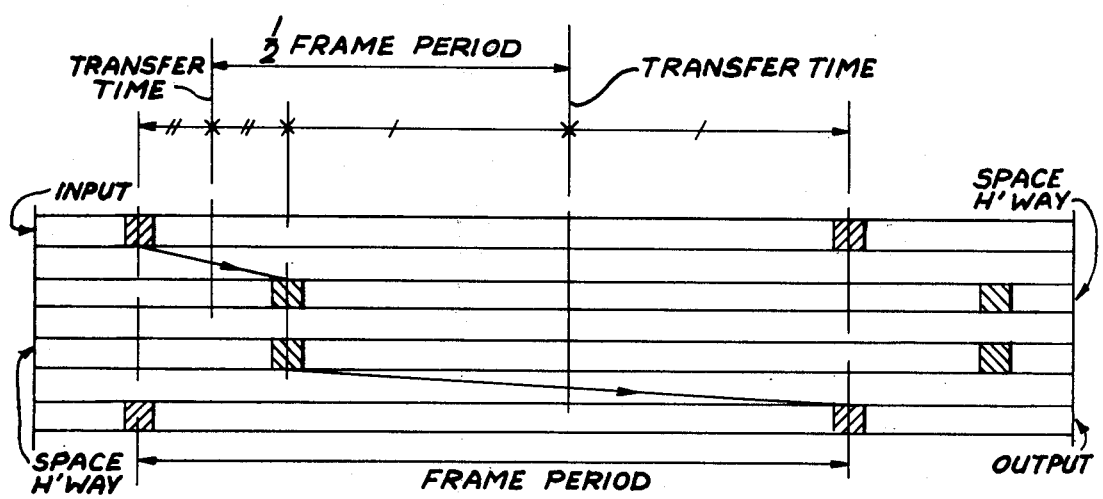
Figure 10:
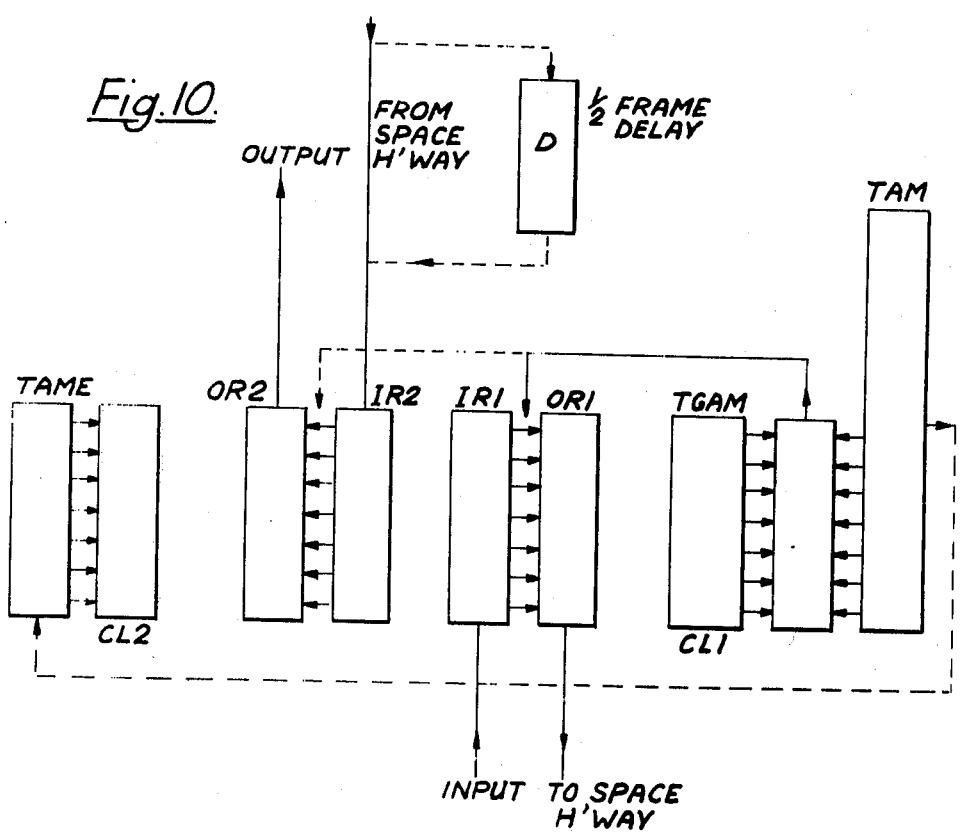
Figure 11:
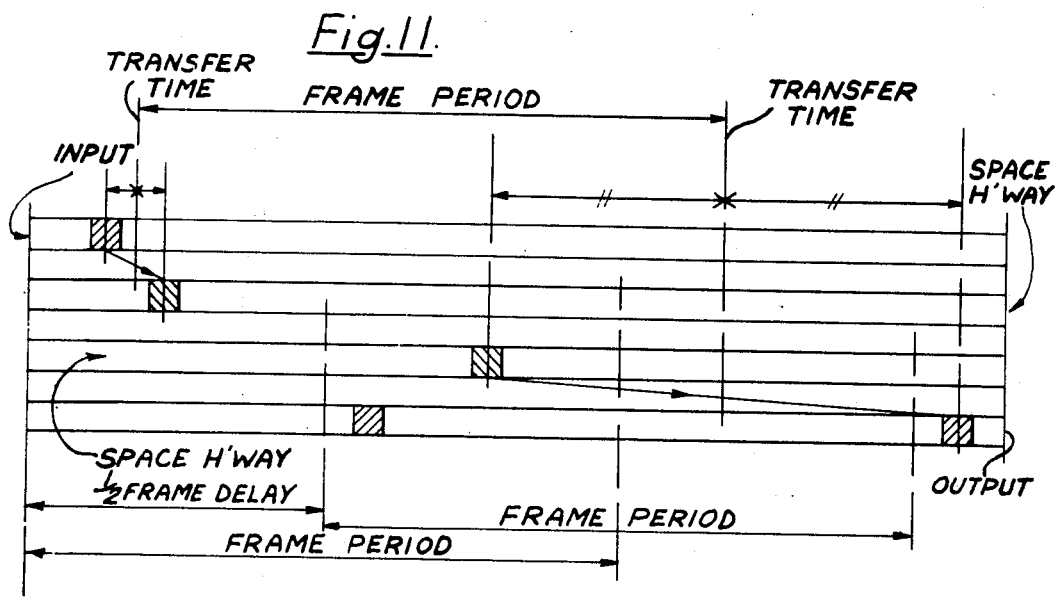
Figure 12:
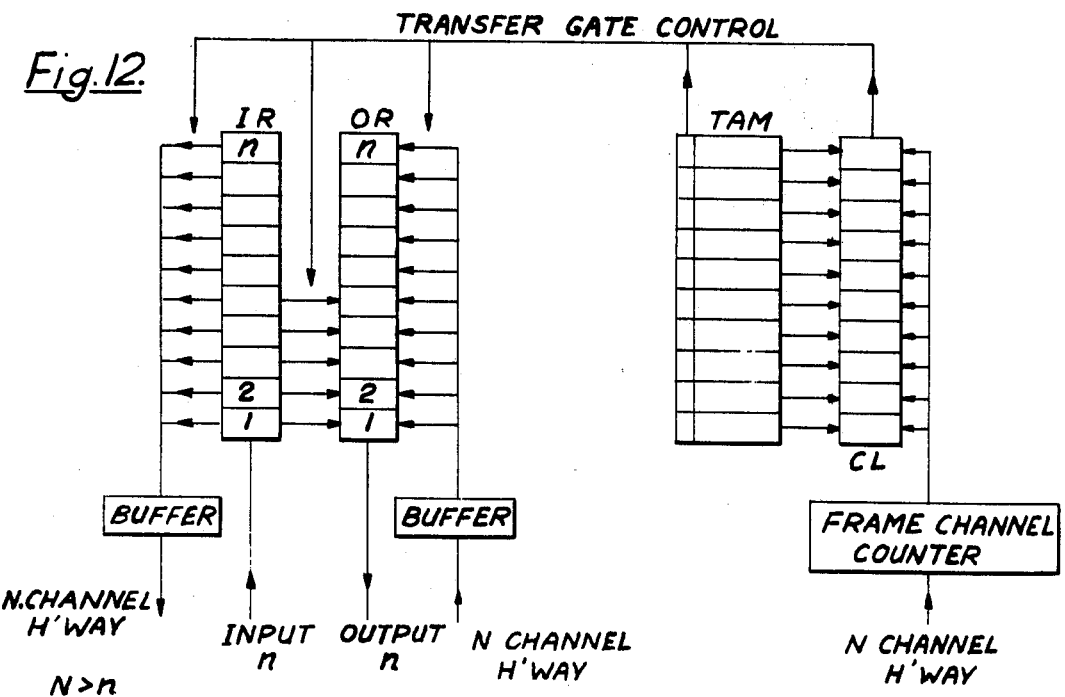
Figure 13:
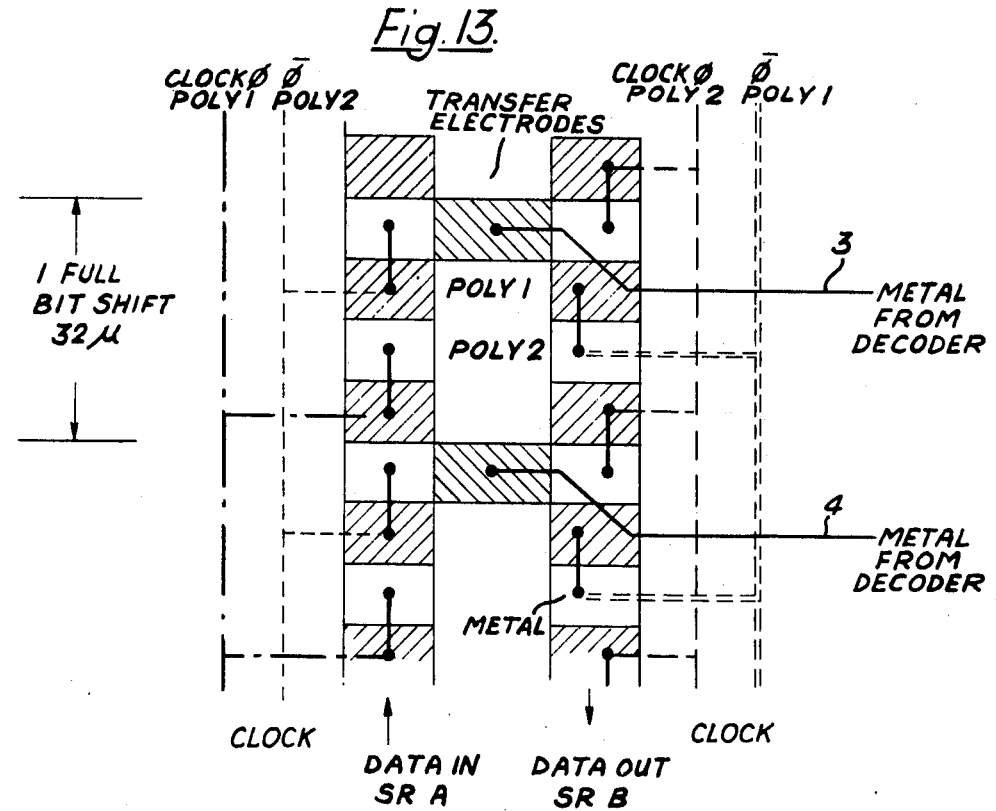

FIG. 3 (comprised of a through e shows the arrangement of cells in the shift registers of FIG. 2 according to the present invention;

FIG. 4 illustrates a first control method for a digital time switch according to the invention;

FIG. 5 illustrates a second control method for a digital time switch according to the invention;

FIGS. 6 & 7 illustrate space/time/space and time/space/time switching structures respectively;

FIG. 8 illustrates a specific time/space/time switching structure;

FIG. 9 is a timing diagram for a digital time switch connected to a space switch;

FIG. 10 illustrates a duplex time switch structure for connection to a space switch;

FIG. 11 is a timing diagram for a duplex digital time switch connected to a space switch;

FIG. 12 illustrates an alternative form of duplex time switch for connection to a space switch; and FIG. 13 illustrates a time switch shift register structure implemented in charge coupled device (CCD) technology.

To utilize such a transfer mechanism as that illustrated in FIG. 3 in a practical system, it is necessary to provide control means for the transfer gates, so that the appropriate gate or gates are enabled during each half of a register shift period. One method is that shown in FIG. 4. Each of the n/2 transfer gates TG has an associated binary address which is permanently stored in the transfer gate address memory. TGAM. Control of the transfer gates is effected by means of a circulating connection memory termed the time address memory TAM which comprises n words of $\log_2 n$ bits, shifting in phase with IR. The contents of the ($\log_2 n - 1$) most significant bits of each word for one half of TAM are compared with the corresponding contents of TGAM during each shift period by comparison logic CL. Transfers take place at those locations where there is identity and in the relevant half of the IR shift period specified by the least most significant bit of the TAM word. It will be appreciated that the ($\log_2 n - 1$) most significant bits in each word may appear twice in TAM, once with a least significant bit indicating transfer in the first half of the IR shift period and once with the least significant bit indicating transfer in the second half of the IR shift period. The same TAM word can appear more than twice if the same gate is used for connections in more than one IR shift period.

The operation has been described with reference to a bit multiplexed highway. The operator is the same when 8 bit PCM bytes are switched in parallel, except that there are 8 register pairs and 8 sets of parallel transfer gates. Transfer takes place in bursts of 8 bits.

The operation of making a connection i.e. marking, is that of inserting a suitable address into TAM in a position corresponding to each of the channels being interconnected. The required address for inter-connecting channels X and Y are:

$$X \longrightarrow \frac{ny - nx}{2}$$
$$Y \longrightarrow \frac{nx + n - ny}{2}$$

where n is the total number of channels in the highway and nx and ny are the addresses of the channels being interconnected. (ny > nx). The integer part of the quotient is associated with the ($\log_2 n - 1$) most significant bits and the remainder (i.e. 0 or 0.5) is associated with the least most significant bit.

These numbers are readily written into TAM as it shifts. Thus, for example, the equivalent of ny−nx/2 is gated in at time tx as the TAM contents are circulated.

An alternative control method is to use a highway multiplex frame channel counter as a clock for timing the various transfers between the input and output shift registers, as shown in FIG. 5. TAM now contains the transfer time for the corresponding channels of the input highway.

The frame channel counter counts the highway channel times in each frame. The per channel contents of TAM are compared concurrently with the count in the counter in each basic IR shift period. When there is identity in the comparison logic CL a corresponding transfer takes place between IR and OR. Again the least significant bit in TAM indicates in which half of the IR shift period the transfer is to take place.

The contents of TAM for a connection between channels X and Y are derived as follows:

$$X - \frac{ny - nx}{2} + nx = \frac{ny + nx}{2}$$
$$Y - \frac{nx \, n - ny}{2} + ny = \frac{nx = ny + n}{2}$$

The integer part of the quotient and the remainder have the same significance as mentioned previously.

The basic structures of FIG. 4 or 5 form in essence a single time switch. By incorporation with suitable space switching structures either a space/time/space switching structure or a time/space/time switching structure can be constructed, e.g. as shown in FIGS. 6 and 7 respectively. TS is a time switch as shown in FIG. 4 or 5, while the space switches are conventional structures. Whereas the space/time/space (STS) for FIG. 6 could be implemented with a minimum of one time switch, with the requirements that two paths need to be marked (one go and one return) in the time switch, in the time/-space/time (TST) structure of FIG. 7 a minimum of two basic time switches TS are required per time switched duplex highway. Thus a minimum of four TAM memories need to be marked for implementing any possible connection using the space switch.

Consider now the more detailed illustration of a specific TST structure shown in FIG. 8. A common time address memory TAM is used for both input and output switching functions. The system utilizes co-located input and output speech memories in each direction. Speech bits from channel X are received in speech memory 1, the address $Z_{xin}$ of this memory location (word) being noted in location X of time address memory 6. Similarly the incoming speech bits from channel Y are inserted into speech memory 2 and the address $Z_{yin}$ of this location is noted in location Y of time address memory 6. When the transfer time occurs the speech memories 1 and 3 are inter-connected by the space switch under the control of space address memories 7 and 8, likewise speech memories 2 and 4. The contents of locations $Z_{xin}$ and $Z_{yin}$ are transferred to locations $Z_{yout}$ and $Z_{xout}$ respectively under the control of time address memories 5 and 6 and the contents of these locations are subsequently read out to the outgoing lines. However, when connections are required to be made between two channels within the same duplex highway no use is made of the space switch portion of the structures. Such connections are realised by a violation of the normal (i.e. inter-time switch module) operation. For such internal connections the operations of the input and output speech memories are interchanged for one of the two channels being inter-connected. The two models of operation are illustrated in FIG. 8 for reference purposes.

For a TST structure utilising a basic time switch as described with reference to FIG. 4 or FIG. 5, reference is first made to the timing diagram of FIG. 9. It will be noted that the sum of the delays necessary for interconnecting channels X and Y in both directions is equal to one frame period. Also, due to the mode of operation the transfer times for each direction are respectively mid-way between times $t_x$ and $t_y$ in the one direction and $t_y$ and $t_x$ in the other direction. Thus the time interval between the two transfers is one half of a frame period.

Consider now the arrangement shown in FIG. 10 which illustrates the application of the invention to the TST structure of FIG. 8. Two pairs of shift registers IR1, OR1, IR2 and OR2 are used, one for each direction of operation. Each pair of shift registers functions identically to the basic structure illustrated in FIG. 4 or FIG. 5, the main difference being that they share a common time address memory TAM and transfer gate address memory TGAM. Two different methods of controlling the transfer gates are possible.

One method uses an extension TAME of the time address memory TAM, with a second set of comparison logic CL2. The TGAM outputs to CL1 are duplicated to CL2 and TAME is fed with information from the midpoint of TAM, thus introducing the required one half frame period delay between the transfer times of the two pairs of shift registers.

The second method utilises TGAM and CL1 only to control both sets of transfer gates but a one half frame period delay D is introduced into the input to IR2. In either method TGAM can be replaced with a frame channel counter as previously described. It is evident from the timing diagram of FIG. 11 that this form of common control can be used for the transfers between IR1 and OR1 and also between IR2 and OR2. The penalty to be paid for the simplification of the circuitry is the extra half period of delay in each direction of the connection (remembering that in a full TST structure there will be two arrangements corresponding to FIG. 10). However any time delay in the intervening space switching operation can conveniently be accommodated in that half frame period delay. Internal connections between two channels connected to the same time switch can be implemented through the space switch even though only one TAM is involved, giving rise to some potential control simplification of the total TST structure.

Another application of the invention is a multiple time switch arrangement connected to a common larger capacity simplex or duplex highway, e.g. the case where n 32 channel time switches are connected to a 256 channel TDM simplex or duplex highway, in which internal connections are also required. The timed transfer control methods described above result in the simplest solutions. The switching structure shown in FIG. 12 illustrates just one switch arrangement. The time switch registers IR and OR associated with the incoming and outgoing 32 channel highways are, in this case, each a full frame in length (compared with the half frame length registers in FIGS. 4 and 5). For internal connections within the time switch transfer gates are only required between corresponding halves of IR and OR. For connections via the space switch each register requires a full 32 transfer gates. Transfers between the registers and the space switch take place via highway input and output buffer stores BSI and BSO. Control of transfers is by means of the 32-channel TAM which circulates in synchronism with the 32-channel input highway. Transfers take place at a time specified by the contents of the appropriate location in TAM. Selection of which type of transfer to implement i.e. internal connection or connection to the common highway, is by a special additional bit in TAM. Note that the registers IR and OR shift at a rate governed by the input and output dedicated 32-channel highways whilst the 256-channel counter (frame channel counter) is counting at the channel rate of the common highway.

The above arrangements lend themselves to ready implementation in the so-called charge coupled device (CCD) technology. This technology is described in, inter alia "Charge Coupled Devices in Signal Processing Systems", Vol. 1, Digital Processing TRW July 1974, Contract N0014-74-C-0068; also "International converence Technology and Applications of CCD", University of Edinburgh 25-27 Sept. 1974.

Summarised it can be said that CCD devices as opposed to normal integrated circuits which control the flow of current, utilises "charge packets" which can be shifted under the control of suitably laid out and timed clock electrodes. The shaping and/or the clocking of these electrodes ensures a unidirectional flow of these charge packets. As such CCD technology does therefore not require any diffusion except in the charge generators and charge annihilators.

These charges can be detected in a destructive and non-destructive mode. The latter is of great importance because it allows non-destructive readouts of shift register memories and amplification through so-called "distributed floating gate amplifiers".

Besides the shift register function which is a "natural" function of CCD technology one further function is available easily, namely the counter-function up to say a division ratio of 7 or a multiple thereof. And/or, nand/-nor, multipliers etc. are also possible.

The CCD shift register cell size is about 1.25–2.5 mil$^2$ as opposed to 20–30 mil$^2$ for n-channel silicon gate equivalent devices. A divider by 5 may call only for 10–15 mil$^2$ compared to an n-channel silicon gate 60–80 mil$^2$. Power dissipation can be extremely low, only the clock dissipating power. A simple gate for example may dissipate as little as 1.5 $\mu$W at 1 MHz. Operation at 4 MHz has been demonstrated and it is expected that this frequency limit would be raised to 10 MHz and higher. New configuration and technologies in these areas have been shown to work at over 100 and 200 MHz.

The advantages of CCD technology are most evident in systems which are predominently shift registers and counters, like those described above, in which the basic principle is that any time slot of a PCM frame can be replaced into any other time slot by delaying it by a suitable amount utilising shift registers as the delay means. Present day CCD technology can operate at up to 4MHz and probably at up to 10MHz. As in any high density large scale integrated (LSI) circuits the maximum functioning density would be defined by the interconnection density which in turn is a function of the number of levels of interconnect and the minimum geometries allowed for this interconnect. Present day technology allows four layers of interconnect namely one diffusion, two levels of polysition and one layer of metal. The diffusion interconnect is non-preferred due to capacitance to the substrate. The minimum dimensions of the geometrical pattern are 8 microns or 0.3 mils. An example of the sort of structure which would be required for time switches as described above is shown in FIG. 13.

For dimensions in general it will be assumed that 1.5 mil$^2$ per full bit shift stage will be required which, with wiring will need 3 mil$^2$ of silicon. This is consistent with 1 mil long electrodes across the charge path and 10 micron wide electrons using 8 microns of silicon due to overlapping. Hence the real minimum cell size is 1.25 mil$^2$.

The structure shown in FIG. 13 illustrated a shift register pair shifting in opposite directions, being clocked in antiphase with a single electrode transfer gate. The clock pulses $\phi$ and $\phi$ are applied via metal conductors to the polysilicon levels Poly 1 and Poly 2 for each shift register. The transfer electrodes receive the timed transfer signals from the comparison logic via metal conductors 3, 4. The transfer electrode is clocked when required in phase (or slightly delayed) with the originating shift register clock. As such the transfer could go either right to left or left to right depending on which clock was used. Every transfer gate can be clocked independently.

We claim:

1. A digital time switching network including at least one pair of similar shift registers, incoming and outgoing respectively, each having a like capacity, said registers being arranged in a parallel configuration but shifting in opposite directions, a plurality of transfer gates for selectively transferring the contents of cells of the incoming shift register to cells of the outgoing shift register, control means for controlling cells of the outgoing register, means for clocking the shift registers at the same rate, said control means comprising a circulating memory circulating in synchronism with the incoming register, wherein information relating to the required transfer time of each of said transfer gates is stored in said incoming register, a source of transfer gate identities and means for producing a control signal for operating each transfer gate when there is coincidence of an indication of transfer time information for that gate and the gate identity.

2. A network according to claim 1, wherein said shift registers are clocked alternately, said circulating memory having a number of storage positions equal to the bit capacity of both of said registers with each storage position having two portions, one portion of each position having stored therein the identity of a transfer gate and the other portion having stored therein timing information indicating the timing of a transfer operation for that gate either in the interval between the clocking of the incoming register and the subsequent clocking of the outgoing register or in the interval between the clocking of the outgoing register and the subsequent clocking of the incoming register, said means for producing control signals comprising comparison means between successive positions of said circulating memory and said source of transfer gate identities.

3. A network according to claim 1, wherein the source of transfer gate identities comprises a static memory having a plurality of storage locations each of which holds the identity of one transfer gate.

4. A network according to claim 1, wherein the source of transfer gate identities is a counter counting in a repetitive sequence corresponding to frame channel occurrences in an input highway feeding the incoming register.

5. A network according to claim 1, including at least one further pair of shift registers similar to the first pair and with a second and similar plurality of transfer gates therebetween, and in which simultaneous transfers between register cells in each pair being under the control of the same circulating memory and source of transfer gate identities in the control means.

6. A network according to claim 5, including an additional shift register memory having storage positions corresponding in number to the bit positions of said first-mentioned register and a second means for producing control signals, said further shift register memory being fed with the information stored in the circulating memory from a predetermined point in the circulating memory.

7. A network according to claim 5, wherein the second transfer gates are controlled by the same control signals as the first transfer gates.

8. A network according to claim 7, including means for introducing into the input of the incoming shift registers of one pair a delay equal to half a frame period.

9. A network according to claim 1, wherein there are additional parallel transfer means between all the cells of the incoming register and a serial output highway and between all the cells of the outgoing register and a serial input highway, the control means providing control signals for all the transfer means whereby signals may be selectively transferred via the additional transfer means from the input highway to the outgoing register and from the incoming register to the output highway and via the first transfer means from the incoming register to the outgoing register.

* * * * *